Dec. 28, 1926.  
H. A. G. FORNELIUS  
PISTON RING TOOL  
Original Filed Oct. 24, 1925

1,612,626

WITNESSES  
W. C. Abbott  
Hugh H. Ott

INVENTOR  
Henry A. G. Fornelius  
BY Munn & Co  
ATTORNEYS

Patented Dec. 28, 1926.

1,612,626

UNITED STATES PATENT OFFICE.

HENRY A. G. FORNELIUS, OF CLIFTON, NEW JERSEY.

PISTON-RING TOOL.

Application filed October 24, 1925, Serial No. 64,668. Renewed November 18, 1926.

This invention relates to tools for contracting piston rings to facilitate their application to a piston, and has particular reference to an improvement over a similar device granted to me August 12, 1924, bearing United States Letters Patent No. 1,505,017.

In addition to the objects and advantages attained by my prior patent, the present invention comprehends an improvement in the means for holding the flexible resilient ring-embracing member in approximately ring form so as to facilitate the fitting of the member over the ring.

The invention furthermore contemplates an improved piston ring tool which is comparatively simple in its construction and mode of operation, inexpensive to manufacture, and which is highly efficient in its purpose.

With the above recited and other objects in view, reference is had to the following specification and accompanying drawings in which there is exhibited one example or embodiment of the invention which is in no way intended as a limitation upon the scope of the appended claims, as it is to be clearly understood that variations and modifications which properly fall within the scope of said claims may be resorted to when found expedient.

In the drawings—

Figure 1:
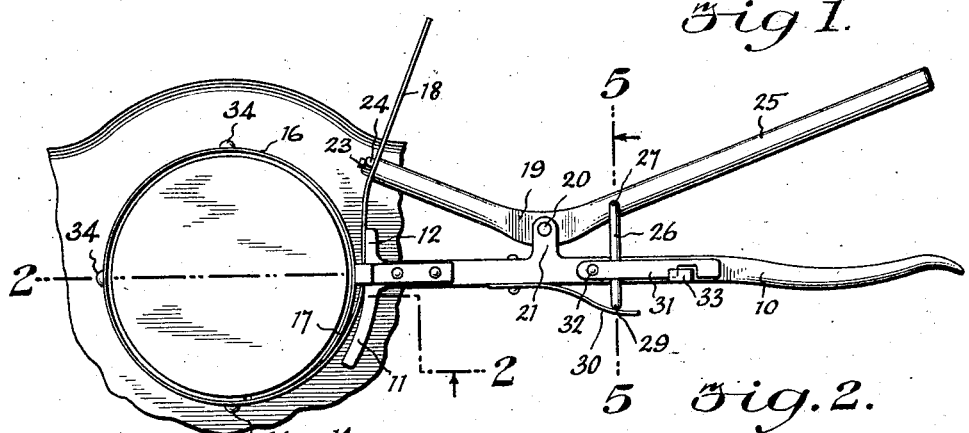
Figure 1 is a plan view of the tool illustrating the use of the same.
Figure 2:
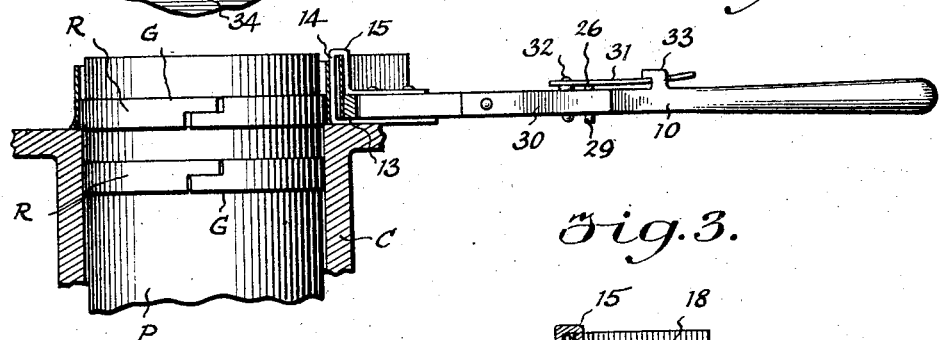
Fig. 2 is a longitudinal sectional view therethrough taken approximately on the line 2—2 of Fig. 1.
Figure 3:
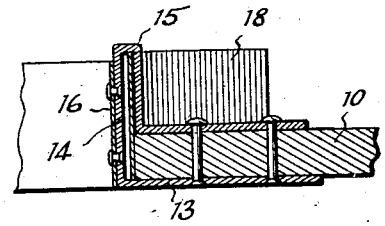
Fig. 3 is a fragmentary enlarged sectional view similar to Fig. 2.
Figure 4:
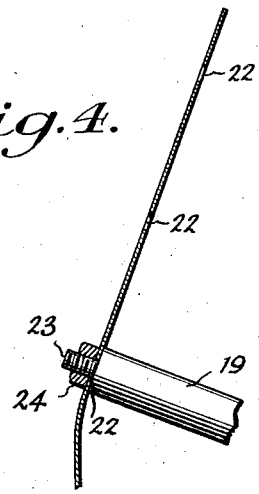
Fig. 4 is a detail fragmentary sectional view of the adjustable connection between the operating lever and the flexible resilient ring-embracing member.
Figure 5:
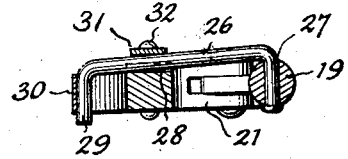
Fig. 5 is an enlarged cross-sectional view taken approximately on the line 5—5 of Fig. 1.

Referring to the drawings by characters of reference, 10 designates a handle or shank which is formed at one extremity with oppositely projecting arms 11 and 12, the former being of relatively greater length than the latter and of substantially arcuate formation for a purpose to be hereinafter set forth. The said extremity is also provided with an extension arm 13, bent transversely across the extremity at 14 and provided with a return bent terminal 15. A strip or band of flexible resilient material 16 is secured to the portion 14 of the arm 13 with one extremity 17 extending to a point substantially in alinement with the end of the arm 11, the remainder being bent in ring form and trained between the extremity 17 and the arm 11 and under the portion 14 with the opposite end 18 protruding beyond the arm 12. A lever 19 is pivoted or fulcrumed as at 20 to a bearing lug 21 on the side of the handle 10 from which the arm 12 projects. The end 18 of the band or ring 16 is formed with a plurality of longitudinally spaced openings 22 adapted to selectively receive therethrough the threaded terminal 23 of the lever 19, after which a retaining nut 24 is applied. The opposite arm 25 of the lever 19 constitutes a manipulating handle, which upon swinging movement toward the handle 10, effects a circumferential contraction of the band 16. The inherent resiliency of the strip or band 16 functions to normally effect a radial or circumferential expansion thereof, and in order to further augment the radial or circumferential expansion a rod 26, pivoted at 27 to the arm 25 of the lever, extends transversely across the handle 10 through a notch or groove 28 therein, with its opposite free bent terminal 29 engaged by a leaf spring 30 secured to the handle 10.

In order to provide means for retaining the lever in its various rocked positions, a friction latch 31 is provided which is pivoted at 32 on the handle 10 and is swingable across the rod 26 with its free end engageable under the keeper 33.

At circumferentially spaced points on one edge of the strip or band 16, are a plurality of offset lugs 34.

In use and operation of the device, the threaded extremity 23 is initially engaged in one of the longitudinally spaced openings 22 on the end 18 of the band or strip 16 so that the expansion and contraction of the ring between certain limits may be obtained by rocking the lever 19. The confinement of the medial portion of the strip between the end 17 and the arm 11, serves to maintain the same in substantially ring form, while the arm 13 and terminal 15 constitute means for preventing lateral movement of the strip. In use of the device, to apply the piston rings R to a piston P and insert the same in a cylinder, the mechanic initially positions the ring in the ring groove G and engages the ring-shaped band 16 over the piston ring R. As the applied ring is brought into juxtaposition to the cylinder, the arm 25 of the lever and the handle 10 are grasped to effect a contraction of the piston ring to permit the same to slide within the bore of the cylinder C. The offset lugs 34 engage the cylinder head to hold the band or strip 16 in seated relation on the cylinder head as the piston with the applied rings is slid therethrough. In event it is desired to turn the rings, the arcuate arm 11 serves in the capacity of a backing member with which the outer periphery of the strip or band 16 engages.

What is claimed is:

1. A piston-ring tool, including a shank, a flexible resilient strip secured to and spaced from one terminal of the shank and having an end extending beyond its point of securement to the shank, the remainder being arranged in ring form and trained between said extended end and the extremity of the shank, and means carried by the shank and connected to the remaining end of the strip for effecting circumferential contraction and expansion thereof.

2. A piston-ring tool, including a shank, a flexible resilient strip secured to and spaced from one terminal of the shank and having an end extending beyond its point of securement to the shank, the remainder being arranged in ring form and trained between said extended end and the extremity of the shank, and means carried by the shank and connected to the remaining end of the strip for effecting circumferential contraction and expansion thereof, said means having adjustable connection with the strip.

3. A piston-ring tool, including a shank, a flexible resilient strip secured to and spaced from one terminal of the shank and having an end extending beyond its point of securement to the shank, the remainder being arranged in ring form and trained between said extended end and the extremity of the shank, and means carried by the shank and connected to the remaining end of the strip for effecting circumferential contraction and expansion thereof, said means having adjustable connection with the strip, consisting of a plurality of longitudinally spaced apertured portions on the free end of the strip and a threaded stud having a removable nut on the free end of said means.

4. A piston-ring tool, including a shank, a flexible resilient strip secured to and spaced from one terminal of the shank and having an end extending beyond its point of securement to the shank, the remainder being arranged in ring form and trained between said extended end and the extremity of the shank, means carried by the shank and connected to the remaining end of the strip for effecting circumferential contraction and expansion thereof, said means having adjustable connection with the strip, consisting of a plurality of longitudinally spaced apertured portions on the free end of the strip and a threaded stud having a removable nut on the free end of said means, and a device for locking said means in relatively adjusted positions.

5. A piston-ring tool comprising a shank having a pair of oppositely projecting arms at one terminal, an arm projecting longitudinally from said terminal and provided with a transversely bent portion spaced from the terminal, a resilient flexible band secured to the transversely bent portion thereof with one end projecting therefrom and the remainder arranged in ring form and engaging under said end with the remaining end extending between the transversely bent portion of the longitudinally extending arm and projecting therefrom, a lever pivoted to the shank having adjustable means of connection with the free end of the band, and latch means for holding the same in a position to retain the band in contracted ring form.

HENRY A. G. FORNELIUS.